United States Patent
Binda

(10) Patent No.: US 10,651,434 B2
(45) Date of Patent: May 12, 2020

(54) METHOD OF MAKING A COVER FOR THE POSITIVE PLATE FOR ACID BATTERIES AND THE COVER FOR THE POSITIVE PLATE FOR ACID BATTERIES

(71) Applicant: Wadysaw Binda, Bielsko-Biaa (PL)

(72) Inventor: Wadysaw Binda, Bielsko-Biaa (PL)

( * ) Notice: Subject to any disclaimer, the term of this patent is extended or adjusted under 35 U.S.C. 154(b) by 320 days.

(21) Appl. No.: 15/430,460

(22) Filed: Feb. 11, 2017

(65) Prior Publication Data
US 2017/0237048 A1   Aug. 17, 2017

(30) Foreign Application Priority Data

Feb. 13, 2016   (PL) .......................................... 416127

(51) Int. Cl.
  *H01M 2/04*   (2006.01)
  *H01M 10/12*   (2006.01)
  *H01M 4/14*   (2006.01)
  *H01M 4/76*   (2006.01)

(52) U.S. Cl.
  CPC ......... *H01M 2/0456* (2013.01); *H01M 2/043* (2013.01); *H01M 4/14* (2013.01); *H01M 4/765* (2013.01); *H01M 10/12* (2013.01)

(58) Field of Classification Search
  CPC ...... H01M 2/0456; H01M 2/043; H01M 2/04; H01M 4/14; H01M 4/765; H01M 10/12
  USPC ....................................................... 429/175
  See application file for complete search history.

(56) References Cited

U.S. PATENT DOCUMENTS

| 2,194,038 A | * | 3/1940 | Wallace, Jr. ............. | D03D 1/00 139/387 R |
| 3,503,807 A | * | 3/1970 | Sundberg .............. | H01M 4/765 429/141 |
| 4,048,399 A | * | 9/1977 | Terzaghi ................ | H01M 4/765 429/141 |
| 5,478,677 A | | 12/1995 | Choi et al. | |
| 7,484,539 B1 | * | 2/2009 | Huang ...................... | D03D 3/02 139/384 R |
| 2008/0042413 A1 | * | 2/2008 | Coleman ................... | D03D 1/02 280/743.1 |
| 2010/0203395 A1 | | 8/2010 | Toniazzo et al. | |
| 2016/0013519 A1 | | 1/2016 | Brown | |

FOREIGN PATENT DOCUMENTS

| EP | 1819001 | 8/2007 |
| PL | 294403 | 2/1993 |
| PL | 205297 | 4/2010 |

* cited by examiner

*Primary Examiner* — Robert S Jones
*Assistant Examiner* — Claire L Roe
(74) *Attorney, Agent, or Firm* — Horst M. Kasper, Esq.

(57) ABSTRACT

A method of making a cover for the positive plate for acid batteries, comprising a set of thermally formed tubes of non-woven fabric, characterised in that a tape (1) of non-woven fabric of a width corresponding to the length of future tubes is wrapped into a single, oval loop, and the extreme ends are laid so as to form an overlap (2) in the zone between vertices (4) of the loop, then the loop is stitched crosswise to form a set of multiple channels (3) which are then thermally formed into cover tubes (6).

4 Claims, 2 Drawing Sheets

Figure 1:
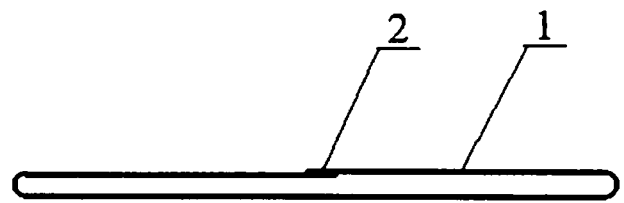

METHOD OF MAKING A COVER FOR THE POSITIVE PLATE FOR ACID BATTERIES AND THE COVER FOR THE POSITIVE PLATE FOR ACID BATTERIES

BACKGROUND OF THE INVENTION

Field of the Invention

The object of the invention is a method of making a cover for the positive plate for acid batteries. The object of the invention is also the cover for the positive plate for stationary and traction acid batteries.

The positive battery plate is constituted by lead-minimum mass which fills up the cover made of a series of vertical tubes of non-woven fabric. An important parameter of the cover is its dimensions which should be as small as possible because they determine the efficiency of plate installation in the battery cell.

Description of Related Art Including Information Disclosed Under 37 CFR 1.97 and 1.98

From European patent specification EP0721671, a cover made of two spun-bonded two-layer sheets of non-woven fabric hot-combined in order to obtain a flat form is known. The sheets are formed as a series of half tubes, and then are connected to each other at regular intervals, thus forming a series of whole tubes which are filled with active mass.

Another solution, known from Polish patent specification PL215013, shows a cover made of two layers of spun-bonded non-woven polyester and two external or internal layers made in the form of a mesh. These layers are connected to each other at equal intervals, thus forming a tape containing a series of identical channels. This tape is coated with a thermosetting impregnant and is perforated with openings having their diameters comprised in the range of 0.1 do 0.5 mm for drainage. Cover formation is carried out by introducing rods, into the tape channels, as cores forming the tubes, by annealing thereof at an appropriate temperature, and cooling down. The already cooled down and formed tape is cut into sections of a predetermined length.

From European patent specification EP0115339, an electrode solution is known which has tubular envelopes arranged in layers and separated by ribs disposed inside spacers arranged in a zigzag pattern. These layers are produced in the weaving process from the fabric constituting the envelope.

All the known methods of making covers caused formation, in the finished cover, of an open lateral edge which increased overall dimensions of the cover. The aim of the invention is to produce a cover without this edge.

BRIEF SUMMARY OF THE INVENTION

The method according to the invention consists in that, first, a tape of non-woven fabric of a width corresponding to the length of future tubes is wrapped into a single, oval loop, and the extreme ends of the non-woven fabric are laid so that they overlap each other, thus forming an overlap. The overlap should be formed in the zone between vertices of the loop. The so arranged loop is stitched repeatedly crosswise to form a set of channels which is then thermally formed into cover tubes.

Extreme ends of the tape, which form the overlap, can be laid directly on top of each other on one side of the loop or on both sides of the central inner section of the loop.

Preferably, the overlap is formed in the central zone of the loop.

Preferably, stitching of two adjacent channels under the overlap is inside of the overlap.

The cover of the positive plate made by the method according to the invention has extreme edges of the non-woven tape located inside the set of tubes on their outer surface.

The primary advantage of the method according to the invention is lack of lateral edges of the cover, and thus reduction of its overall dimensions while maintaining the same number of tubes. This makes it easier to install the positive plate in the separator or the cell. The lack of edges also causes better circulation of electrolyte in the battery cell.

BRIEF DESCRIPTION OF THE SEVERAL VIEWS OF THE DRAWING(S)

Figure 2:
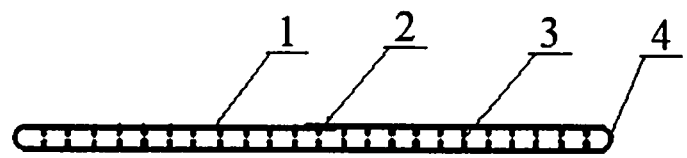
Figure 3:
Figure 4:
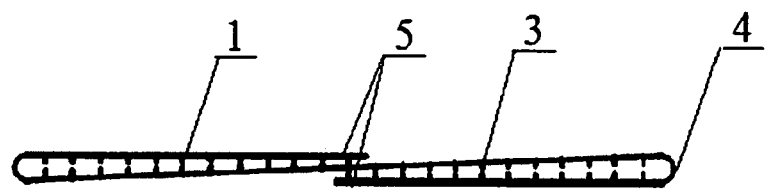
Figure 5:
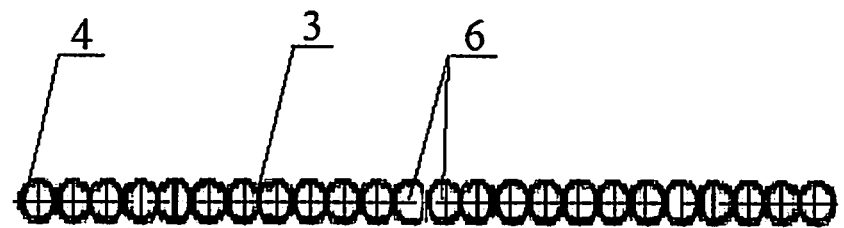
Figure 6:
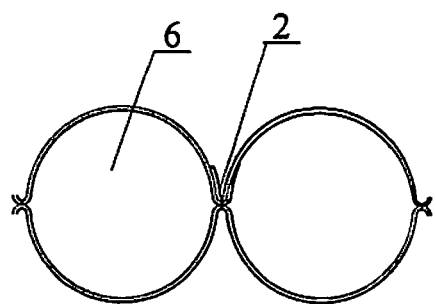
Figure 7:
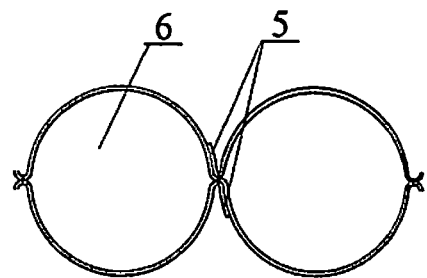

The invention is further presented in embodiments illustrated with the drawing, in which FIG. 1 shows a loop of non-woven tape, FIG. 2 shows the loop with stitches, FIG. 3 shows the loop with endings on both sides of the loop, FIG. 4 shows the loop with stitches and endings on both sides of the loop, FIG. 5 shows the loop with formed tubes in cross-section, FIG. 6 shows two adjacent tubes of the cover with an overlap, FIG. 7 shows two adjacent tubes with an overlap on both sides of the cover.

DETAILED DESCRIPTION OF THE INVENTION

Preparation of the cover begins with preparation of a non-woven tape 1 having a width corresponding to the required length of future tubes of the cover. The tape 1 is laid in an oval loop by applying tape ends of the loop with an overlap 2. The overlap may be located anywhere in the loop between its extreme vertices 4, in the presented embodiment it is located in the central zone. Then, the loop is repeatedly stitched crosswise, resulting in a series of channels 3. In the presented embodiment, the overlap 2 is stitched inside between the extreme edges of the tape 1. The channels 3 are then thermally formed, by means of hot cores, into tubes 6. Second embodiment, presented in FIGS. 3, 4, 7, shows steps for making the cover if the overlap 5 is laid on both sides of the loop. Particular operations when forming the cover are the same as in the first embodiment.

Examples of parts of the finished cover in cross-section of the tubes with overlaps 2 and 5 are shown in FIG. 6 and FIG. 7. The extreme sections of the tape are laid on the surface of the tubes 6 in the inner part of the cover between their extreme edges 4.

The invention claimed is:

1. A method of making a cover for the positive plate for acid batteries, comprising a set of thermally formed tubes of non-woven fabric, wherein a tape (1) of non-woven fabric of a width corresponding to a length of future tubes is wrapped into a single, oval loop, and extreme ends are laid so as to form an overlap (2) in a zone between vertices (4) of the loop, then the loop is stitched crosswise to form a set of multiple channels (3) which are then thermally formed into cover tubes (6).

2. The method according to claim 1, wherein the extreme ends of the tape are laid, to form an overlap (5), on both sides of a central inner section of the loop.

3. The method according to claim 1, wherein the overlap (2 or 5) is formed in a central zone of the loop.

4. The method according to claim 1 wherein stitching of two adjacent channels under the overlap (2 or 5) is inside of the overlap.

\* \* \* \* \*